US010289646B1

(12) United States Patent
Ward et al.

(10) Patent No.: US 10,289,646 B1
(45) Date of Patent: *May 14, 2019

(54) CRITERIA-SPECIFIC AUTHORITY RANKING

(71) Applicant: Resource Consortium Limited, Tortola (VG)

(72) Inventors: David W. Ward, Andover, MA (US); Sabine M. Wolkmer Ward, Andover, MA (US)

(73) Assignee: Resource Consortium Limited (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,760

(22) Filed: May 29, 2018

Related U.S. Application Data

(63) Continuation of application No. 15/370,753, filed on Dec. 6, 2016, now Pat. No. 9,984,162, which is a continuation of application No. 14/660,273, filed on Mar. 17, 2015, now Pat. No. 9,514,193, which is a continuation of application No. 13/415,879, filed on Mar. 9, 2012, now Pat. No. 8,983,943, which is a continuation of application No. 12/112,411, filed on Apr. 30, 2008, now Pat. No. 8,161,040.

(60) Provisional application No. 60/926,730, filed on Apr. 30, 2007.

(51) Int. Cl.
*G06F 7/00* (2006.01)
*G06F 17/30* (2006.01)
*G06F 16/951* (2019.01)
*G06F 16/2457* (2019.01)

(52) U.S. Cl.
CPC ...... *G06F 16/951* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 6,112,202 | A | 8/2000 | Kleinberg |
| 6,285,999 | B1 | 9/2001 | Page |
| 6,356,899 | B1 | 3/2002 | Chakrabarti et al. |
| 6,493,702 | B1 | 12/2002 | Adar et al. |
| 6,594,694 | B1 | 7/2003 | Najork et al. |
| 6,643,640 | B1 | 11/2003 | Getchius et al. |
| 7,039,625 | B2 | 5/2006 | Kim et al. |
| 7,080,073 | B1 | 7/2006 | Jiang et al. |

(Continued)

*Primary Examiner* — Tuan A Pham
(74) *Attorney, Agent, or Firm* — The Belles Group, P.C.

(57) ABSTRACT

In one embodiment, a method of ranking a plurality of linkable documents accessible via a computer network is disclosed. A server analyzes each document so as to measure one or more criteria of the document, each criterion being independent of links between the document and other documents accessible via the computer network and at least one criterion relating to the presence of unsafe or inappropriate content in the corresponding document. Further, the server assigns an independent intrinsic score to each document based on the analysis. The server identifies for each document all links between the respective document and one or more other documents. Further, the server generates a ranking score for each document based on the intrinsic scores and iteratively updating the ranking score of each document based on previous ranking scores and the intrinsic scores of documents linked therewith.

9 Claims, 7 Drawing Sheets

(56) References Cited

U.S. PATENT DOCUMENTS

| | | |
|---|---|---|
| 7,251,654 B2 | 7/2007 | Eiron et al. |
| 7,281,005 B2 | 10/2007 | Canright et al. |
| 7,305,389 B2 | 12/2007 | Zeng et al. |
| 7,356,530 B2 | 4/2008 | Kim et al. |
| 7,392,278 B2 | 6/2008 | Chen et al. |
| 7,505,964 B2 | 3/2009 | Tong et al. |
| 7,698,270 B2 | 4/2010 | Brave et al. |
| 7,756,864 B2 | 7/2010 | Chandrasekar et al. |
| 8,983,943 B2 | 3/2015 | Ward et al. |
| 2002/0129014 A1* | 9/2002 | Kim .................. G06F 17/30864 |
| 2003/0120630 A1 | 6/2003 | Tunkelang |
| 2003/0233345 A1* | 12/2003 | Perisic .............. G06F 17/30867 |
| 2004/0117340 A1 | 6/2004 | Blitzer |
| 2005/0065916 A1* | 3/2005 | Ge ...................... G06F 17/3087 |
| 2005/0144162 A1 | 6/2005 | Liang |
| 2006/0015488 A1 | 1/2006 | Perisic et al. |
| 2006/0074905 A1 | 4/2006 | Yun et al. |
| 2006/0282413 A1 | 12/2006 | Bondi |
| 2007/0016579 A1* | 1/2007 | Kaul ................. G06F 17/30864 |
| 2007/0067294 A1 | 3/2007 | Ward et al. |

\* cited by examiner $$M = \begin{pmatrix} 0 & 0 & 1 & 0 & 0 & 0 \\ 1 & 0 & 0 & 0 & 0 & 0 \\ 0 & 1 & 0 & 1 & 0 & 0 \\ 0 & 0 & 1 & 0 & 0 & 1 \\ 0 & 0 & 0 & 1 & 0 & 0 \\ 0 & 0 & 0 & 0 & 1 & 0 \end{pmatrix} \Rightarrow s = \begin{pmatrix} 0.37 \\ 0.25 \\ 0.54 \\ 0.54 \\ 0.37 \\ 0.25 \end{pmatrix}$$

FIG. 6C $$M = \begin{pmatrix} 0.607 & 0 & 1 & 0 & 0 & 0 \\ 0.607 & 1 & 0 & 0 & 0 & 0 \\ 0 & 1 & 1 & 0.607 & 0 & 0 \\ 0 & 0 & 1 & 0.607 & 0 & 0.044 \\ 0 & 0 & 0 & 0.607 & 0.325 & 0 \\ 0 & 0 & 0 & 0 & 0.325 & 0.044 \end{pmatrix} \Rightarrow s = \begin{pmatrix} 0.480 \\ 0.310 \\ 0.640 \\ 0.481 \\ 0.181 \\ 0.031 \end{pmatrix}$$

FIG. 6D $$M = \begin{pmatrix} 6.07 & 0 & 1 & 0 & 0 & 0 \\ 0.607 & 10 & 0 & 0 & 0 & 0 \\ 0 & 1 & 10 & 0.607 & 0 & 0 \\ 0 & 0 & 1 & 6.07 & 0 & 0.044 \\ 0 & 0 & 0 & 0.607 & 3.25 & 0 \\ 0 & 0 & 0 & 0 & 0.325 & 0.44 \end{pmatrix} \Rightarrow s = \begin{pmatrix} 0.209 \\ 0.282 \\ 0.913 \\ 0.209 \\ 0.018 \\ 0.001 \end{pmatrix}$$

FIG. 6E

CRITERIA-SPECIFIC AUTHORITY RANKING

CROSS REFERENCE TO RELATED APPLICATIONS

The present application is a continuation of U.S. patent application Ser. No. 15/370,753, filed Dec. 6, 2016 (now U.S. Pat. No. 9,984,162), which is a continuation of U.S. patent application Ser. No. 14/660,273, filed Mar. 17, 2015 (now U.S. Pat. No. 9,514,193), which is a continuation application of U.S. patent application Ser. No. 13/415,879, filed Mar. 9, 2012 (now U.S. Pat. No. 8,983,943), which is a continuation application of U.S. patent application Ser. No. 12/112,411, filed Apr. 30, 2008 (now U.S. Pat. No. 8,161,040), claims the benefit of U.S. Provisional Patent Application No. 60/926,730, filed on Apr. 30, 2007. The disclosures of the aforementioned priority applications are herein incorporated by reference in their entireties.

FIELD OF THE INVENTION

This invention relates generally to ranking methods, and more specifically to the intelligent ranking of search results retrieved from an electronic corpus of interlinked documents.

BACKGROUND OF THE INVENTION

A traditional information retrieval (IR) system allows a user to search a large data repository for specific information by accepting a user-input search token, and returning a subset of the repository that matches the search token. For example, the search token can be a word or phrase, and the matches returned by the IR system can be all those documents of the repository that contain this word or phrase. In order to fulfill this function, the information retrieval system contains some form of a look-up table, which lists all possible search tokens, each along with all the documents in which the token appears. Alternatively, the data in the repository can be organized in a way that enables the search of certain descriptive elements, such as bibliographic data, of the individual documents, so that the IR system determines matches based on these descriptive elements rather than on the entire contents of the repository. While IR systems as described above are useful for small as well as highly structured data repositories, they become inefficient with increasing size of the data collections, in particular for loosely structured or unstructured data.

A particularly striking example of a data repository for which traditional IR systems fail is the World Wide Web (the "Web"). An IR system basing search results solely on the occurrence of the search token on web sites would typically deliver many millions of search results, thus placing a significant burden on the user to narrow down the search with more sophisticated and/or more comprehensive search tokens. Current Web search engines therefore augment traditional IR methods by ranking search results that match the search tokens according to one or more additional criteria. One such criterion is the general popularity of each web site relative to others, as it can be measured, for example, in terms of the user traffic to the site or the number of links it receives from other sites. The latter approach, which exploits the hyperlink structure of the Web, is based on the rationale that the number of hyperlinks a web site receives from other sites is indicative of its quality or authority. Authority ranking methods typically determine the authority of each site recursively in terms of the authorities of all the sites linking to it and/or from it. While they have improved on traditional IR systems, the continuing growth of the Web renders their generic, context-independent use of authority increasingly insufficient, as the number of search results with similarly high authority often exceeds the number of results a human user could reasonably review. Moreover, the increasing number of Internet users comes along with a diversification in information needs, which is not adequately reflected in a ranking scheme that gives each link essentially equal weight regardless of context.

Accordingly, there is a need for improved search and ranking methods, which diversify search results delivered in response to a certain search token based on the context of the search and the needs of the particular user.

SUMMARY OF THE INVENTION

The present invention provides systems and methods to improve search result rankings by (i) analyzing and scoring individual nodes of an interlinked data repository according to one or more criteria reflecting search context and/or user interests, and (ii) incorporating these scores, which pertain to the individual nodes and measure their intrinsic properties (as opposed to their relations to other nodes), into algorithms which determine the authority of each node in terms of the authorities of all nodes linking to or from it. Nodes according to the invention can generally be any definite data units, such as, for example, the documents in an electronic corpus of text and media files or, more specifically, the sites of the World Wide Web. Links according to the invention are definite relationships between the nodes, such as, for example, citations of one document by another. In the context of the Web, links include hypertext links between web sites. Examples of scoring criteria applicable to Web sites and other text documents include their readability for a user of a certain age, or their belonging to a certain thematic category.

In various embodiments of the invention, links are weighted by the criteria-specific intrinsic scores of the nodes they originate from and/or the nodes they direct to. Thereby, the authority of a node propagates through a chain of links, and is inherited by other nodes, criteria-specifically. For example, when a teenager searches the Web, a link to a certain web site can be set to carry more weight when originating from a site for teenagers than when originating from a site for younger children. Similarly, in ranking publications on volcanology, citations in geophysics papers can be chosen to be more authoritative than citations in biology papers. This context-dependent use of linking authority increases the effectiveness of authority-based ranking-schemes. Moreover, it can reduce the uncertainty associated with the intrinsic scores assigned to individual nodes, as the propagation of intrinsic node scores to the node under consideration from nodes in its vicinity via the criteria-specifically weighted links can statistically average out these uncertainties. The user benefits by receiving search results more relevant and suitable to her needs and interests.

Accordingly, in a first aspect, the invention provides a method of ranking a plurality of linkable nodes by assigning an intrinsic score to each node, identifying links between the nodes, and ranking each node based on the intrinsic scores of nodes linked therewith, wherein the term "therewith" is meant to include "thereto", "therefrom", or a combination of both, as described further below. The intrinsic score is based on the analysis of the node it pertains to with respect to one or more criteria, which can be, but do not have to be, based on (one or more) user inputs.

In some embodiments, the nodes are ranked in an iterative manner, starting by initializing ranking scores for all nodes, and continuing by repeatedly updating the ranking scores. In each step of the iteration loop, an updated ranking score is assigned to each node based on the intrinsic scores and previous ranking scores of nodes linked with said node. In various embodiments, the iterations continue until a convergence criterion is satisfied. For example, the iterations can be terminated once the difference between subsequent rankings falls below a preset threshold.

Links can be undirected, i.e., they can connect a pair of nodes without distinguishing between the origin and the destination of the link. Alternatively, links can be directed, i.e., they can come from one node and go to the other. Among embodiments utilizing directed links, one can generally distinguish between embodiments wherein the ranking score of a node is based on the intrinsic scores of nodes linked thereto, embodiments wherein the ranking score of a node is based on the intrinsic scores of nodes linked therefrom, and embodiments wherein the ranking score of a node is based on some combination of the intrinsic scores of nodes linked thereto and nodes linked therefrom. In various embodiments, each node is considered as, or defined as, linking to itself (in addition to other nodes if applicable). A link between a node and itself is undirected (or bidirectional) in nature.

In some embodiments, the links are assigned weighting factors, which are subsequently incorporated into the ranking scores. The weighting factor for a link can include the intrinsic score(s) of one or both of the nodes associated with that link, as well as other terms, such as, for example, normalization factors. In general, the overall weighting factor for a link can be a combination (such as, e.g., the product or sum) of several weighting terms. In certain embodiments, a link from a node to itself has a different weighting factor than a link between two different nodes.

In certain embodiments, the nodes represent documents. In these embodiments, a link can represent a reference in one document to another. For example, the documents can be web sites, and the links can represent hyperlinks between these sites. Links between documents are, in some embodiments, weighted by the readability of the documents, or the presence of unsafe or inappropriate content in the document, or both, and the associated weighting factors can further be (but do not have to be) determined with regard to a user's age. Alternatively or additionally, node weighting can be based on the responsiveness of the documents to one or more user-specified topics, which include, but are not limited to, general user interests or the search token itself.

BRIEF DESCRIPTION OF THE DRAWINGS

The foregoing discussion will be understood more readily from the following detailed description of the invention when taken in conjunction with the accompanying drawings.

FIG. 6C illustrates ranking of the nodes of FIG. 6B without regard to readability scores;

FIG. 6D illustrates ranking of the nodes of FIG. 6B with regard to readability scores according to one embodiment; and FIG. 6E illustrates ranking of the nodes of FIG. 6B with regard to readability scores according to an alternative embodiment.

DETAILED DESCRIPTION OF THE INVENTION

Ranking algorithms in accordance with the invention, and applications based thereon, can be carried out efficiently with a computer system. The system can be an individual computer, or a network of computers connected via, for example, the Internet, an Intranet, and/or a Local Area Network. If a network is utilized, the computational load can be distributed over multiple computers. In some embodiments, one or more computers are designated as servers which carry out certain functionalities, and the remaining computers are clients. However, this distinction does not have to be drawn in all embodiments. Depending on the particular application, some implementations can be preferred over others.

Figure 1:
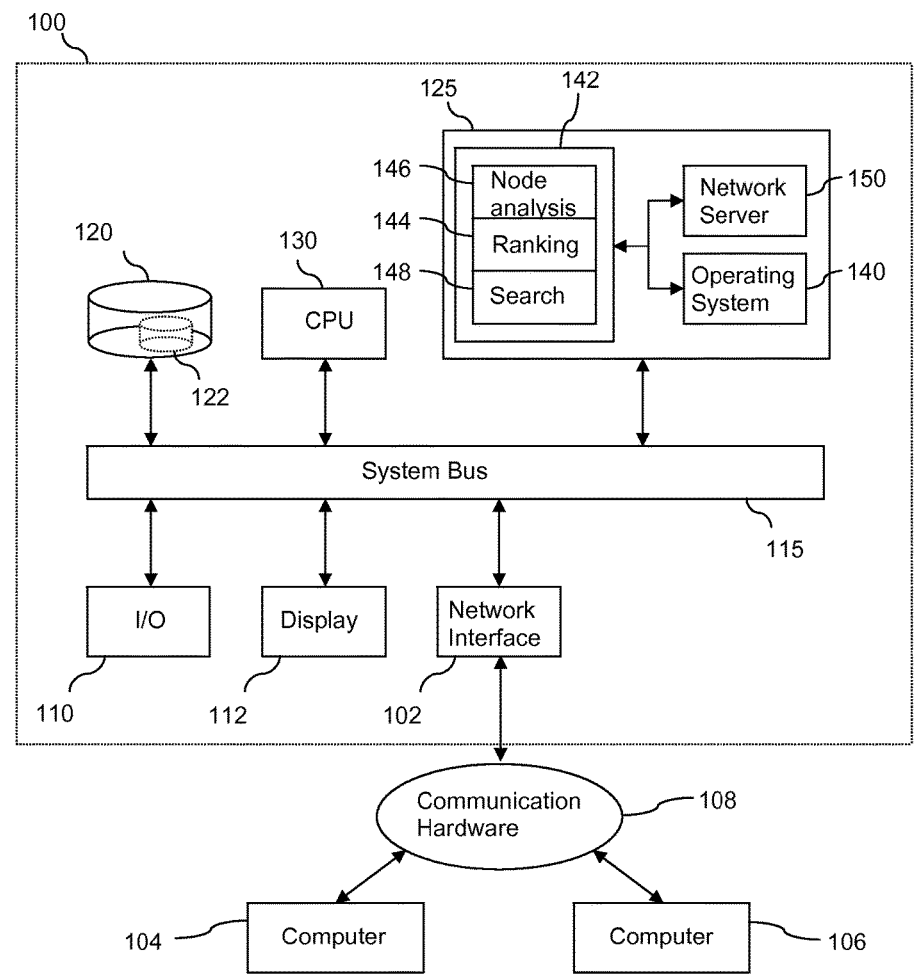
FIG. 1 is a block diagram of a system for executing ranking applications according to the invention.

FIG. 1 illustrates, in block-diagram form, an exemplary computer 100 with capabilities to carry out ranking algorithms in accordance with the invention, as well as its integration into a network. The computer 100 includes a network interface 102 which interacts with other computers 104, 106, of the network via communication hardware 108. The computer 100 also includes input/output devices 110 (e.g., a keyboard, a mouse or other position-sensing device, etc.), by means of which a user can interact with the system, and a screen display 112. The computer 100 further includes a bidirectional system bus 115, over which the system components communicate, a non-volatile mass storage device (such as one or more hard disks and/or optical storage units) 120, which can contain one or more databases 122 representing the nodes to be ranked, and a main (typically volatile) system memory 125. The operation of computer 100 is directed by a central-processing unit ("CPU") 130. The main memory 125 contains instructions, conceptually illustrated as a group of modules, that control the operation of CPU 130 and its interaction with the other hardware components. An operating system 140 directs the execution of low-level, basic system functions such as memory allocation, file management and operation of mass storage devices 120. At a higher level, a service application 142, which integrates a ranking module 144 with node analysis and search modules 146, 148, carries out the search and ranking functionalities of the invention. The service application 142 can receive search and ranking requests directly from another application or a user of computer 100, or from other computers 104, 106 of the network. To enable the handling of requests from computers 104, 106, the main memory 125 contains a network-server block 150. If the network is the Internet, for example, block 150 can be a conventional web server application.

2. Ranking Method

Figure 2:
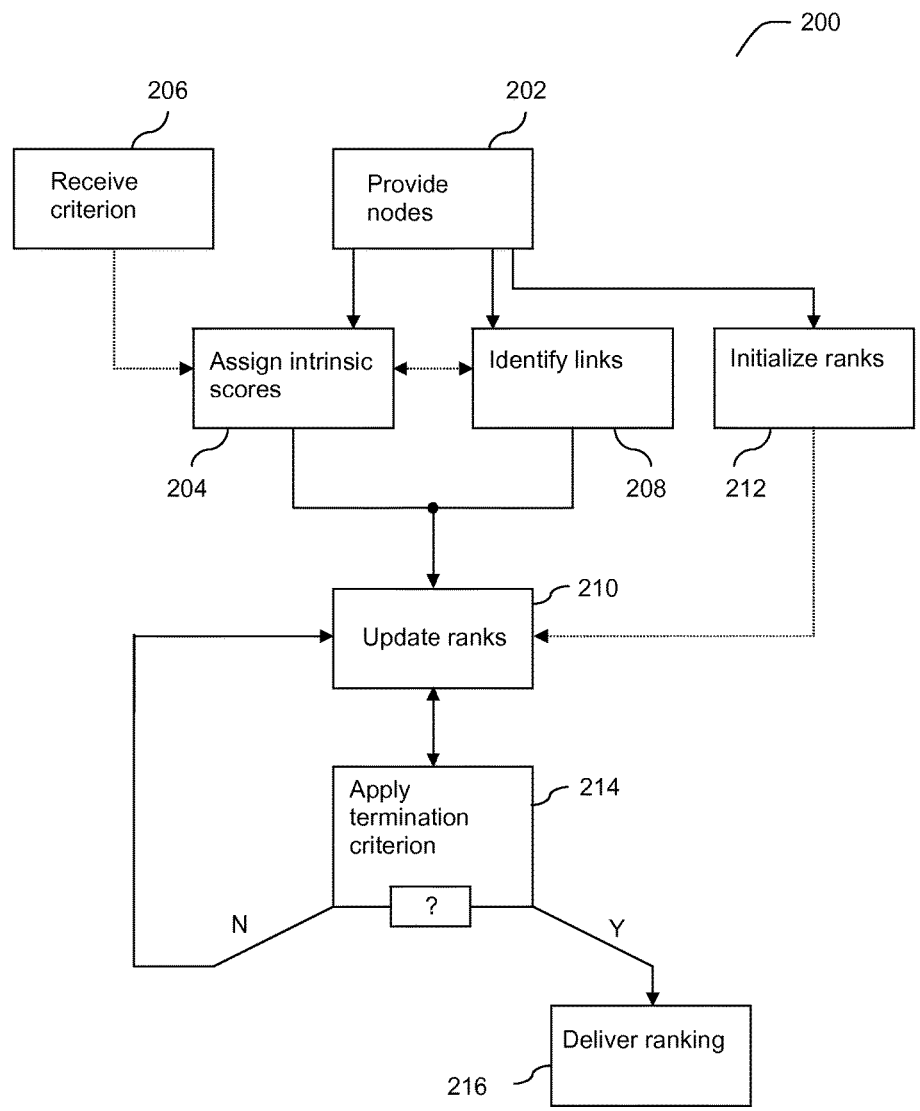
FIG. 2 is a flow diagram illustrating a method of criteria-specific authority ranking in accordance with the invention.

FIG. 2 illustrates, on a conceptual level, the steps of a ranking method 200 according to the invention. In a first step 202, nodes or representations thereof are provided in a format suitable for further processing. For example, if the nodes are documents, they can simply be stored as such in a data repository. In general, any type of node can be represented by entries in a database. In step 204, the nodes are analyzed with respect to one or more criteria measuring some intrinsic property or properties of the nodes. These criteria can be specified in the ranking algorithm (that implements method 200) itself, or they can be provided externally in step 206, e.g., by a human user or a computer application. As a result of step 204, an intrinsic score is assigned to each node.

In step 208, links are identified between the nodes. For example, if the nodes are web sites, these sites can be parsed for hyperlinks. Links can be directed, i.e., originating from one and ending at another node, or undirected.

Steps 204, 208 can, generally, be carried out in any order. However, in some embodiments one step can influence the other, thereby potentially stipulating a certain order. For example, links established initially during step 206 can subsequently be broken based on the intrinsic scores of the nodes they connect and specified intrinsic score thresholds. It is also possible to first establish nodes in step 208 and delete isolated nodes from the network, and then restrict the analysis and scoring step 204 to the remaining interlinked nodes.

Based on the intrinsic scores assigned in step 204 and the links identified in step 208, the nodes are ranked in step 210. In various embodiments, ranking requires the initialization of ranking scores in a step 212 preceding step 210. A convenient initialization assigns to all nodes the same initial ranking score. Alternatively, the initial ranking scores can, e.g., be set to the intrinsic scores of the nodes. After updating the rank in step 210, a termination criterion is applied in step 214. If the criterion is satisfied, a ranked list of nodes is delivered in step 216. If the termination criterion is not met, step 210 is repeated. Typically, ranking is carried out in multiple iterations. The criterion causing termination can be, for example, a counter exceeding a fixed number of iterations, or the convergence of the ranking scores. In some embodiments, the initial scores have no effect on the final scores, but do influence the number of iterations required until convergence (as determined by a certain convergence criterion) is reached.

The method 200 can be implemented in various ways using different data structures. Two classes of embodiments, which employ matrix operations and random walks, respectively, are described in detail in the following sections.

2.1. Matrix Implementation

Figure 3:
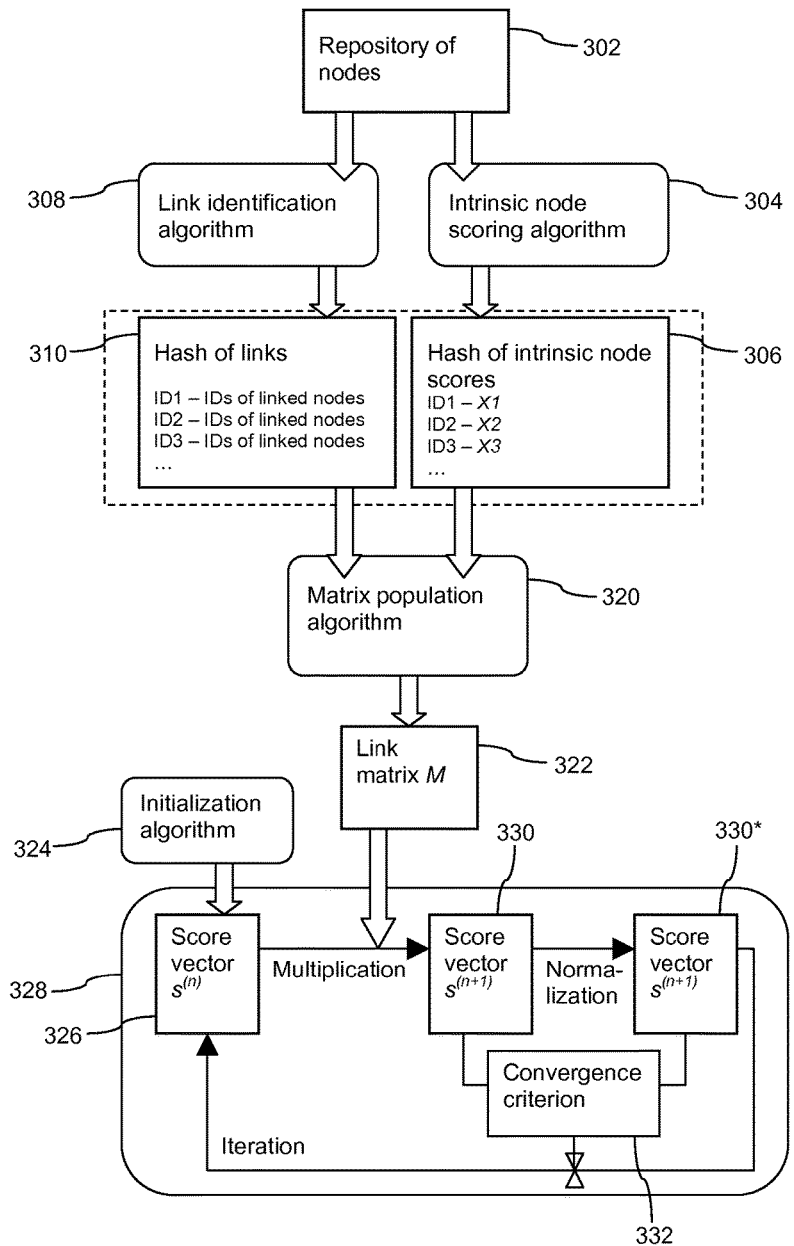
FIG. 3 is a diagram illustrating data structures and algorithms implementing the method of FIG. 2 according to some embodiments of the invention.
Figure 4:
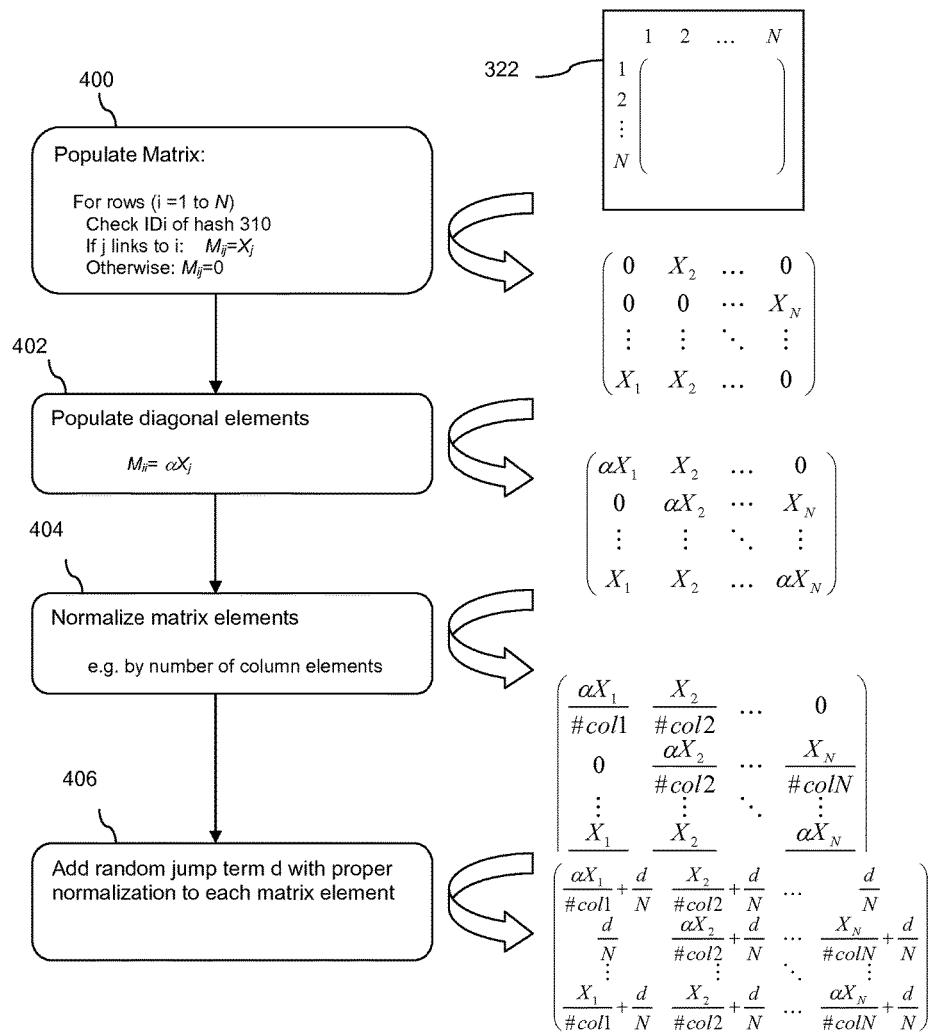
FIG. 4 is a flow chart detailing the algorithm shown in FIG. 3 for populating the link matrix.

A network of N interlinked nodes can be represented mathematically in form of an N×N matrix M, whose entry Mij in the i-th row and j-th column has a non-zero value (e.g., 1 or a normalization or weighting factor) if and only if node j links to node i. The N ranking scores, or authority scores, $s_j$ can be written as a column vector s. By multiplying the link matrix M to the ranking score vector s, a new vector is obtained, which contains in its i-th element the sum of all the (previous) ranking scores $s_j$ of nodes j that link to node i, multiplied with the corresponding link normalization or weighting factors, if applicable. A self-consistent set of ranking scores corresponds to an eigenvector of the link matrix M, i.e. a vector which, if the matrix M operates on it, results in the same vector, up to an overall factor (the eigenvalue) which does not affect the relative scores. FIGS. 3 and 4 illustrate the data structures and algorithms associated with implementations of method 200 that utilize such a matrix representation. In these embodiments, the intrinsic scores are incorporated directly into the link matrix M to realize criteria-specific authority ranking.

The ranking algorithm is performed on a repository 302 of N nodes, as shown in FIG. 3. A scoring algorithm 304, which implements step 204, computes an intrinsic document score X, e.g. a readability score, for each of the N documents, and stores the document IDs (key) with the corresponding scores X (value) in a hash table 306. A link identification algorithm 308 searches each of the nodes for links to other documents, and writes these links to a hash table 310, each row of which consists of a document ID as the key, and a list of IDs of all documents that link to it as the corresponding value. The data contained in hash tables 306 and 310 can alternatively be stored together in one database. The hash table 310 can, in some embodiments, be replaced by a raw link matrix M'. However, if the total number of links is linear or sub-linear in the number of nodes N, a hash table can be advantageous due to lower storage requirements. Algorithm 320 uses the information stored in hash tables 306, 310 to populate the N×N link matrix M (322), as described below in connection with FIG. 4.

To start the computation of ranking scores, algorithm 324 initializes an N-component vector $\underline{s}^{(n)}$ (326) with n=0. Algorithm 328 then iteratively multiplies the matrix M to the score vector $\underline{s}^{(n)}$, resulting in an updated score vector $\underline{s}^{(n+1)}$ (330) with components $s_i^{(n+1)} = \Sigma_j M_{ij} s_j^{(n)}$. Typically, algorithm 228 normalizes the score vector $\underline{s}^{(n)}$ (330), e.g. by dividing each component $s_i^{(n)}$ by the largest component $s_{i_{max}}^{(n)}$ or by the sum of all components, resulting in a normalized score vector 330*. In order to determine when to leave the iteration loop, the algorithm 328 employs a convergence criterion 332 which compares the difference between consecutive score vectors to some preset number, which should depend on the chosen normalization. If the largest vector component is normalized to 1, for example, the criterion might state that the iterations are terminated when the sum of component differences is smaller than 0.01 times the sum of the components of $\underline{s}^{(n)}$: $\Sigma_i |s_i^{(n+1)} - s_i^{(n)}| < 0.01 \, \Sigma_i s_i^{(n)}$. The vector of ranking scores arrived at through the above algorithm can directly be used to rank the N nodes, with the highest score corresponding to the highest ranking node. Alternatively, the ranking scores can be further processed and combined with other scores to produce the final ranking scores.

FIG. 4 details how the algorithm 320 populates the link matrix M (322), using the intrinsic document scores X as link weighting factors. In a first step 400, the algorithm 320 assigns each non-diagonal element $M_{ij}$ the intrinsic score $X_j$ of node j if that node links to document i, and otherwise zero. In a second (optional) step 402, it further assigns each diagonal element $M_{ii}$ the score $X_i$, multiplied by an additional weighting factor α. This step effectively establishes links between each node and itself. The weighting factor α determines the relative importance of the intrinsic score $X_i$ of node i itself, and the weighted authority it receives through links from other nodes. In a third (optional) step (404), the matrix can be normalized according to a specified rule. For example, as illustrated, each element can be divided by the number of non-zero elements in its respective column, so that the weight of a link is indirectly proportional to the total number of links (including the link to itself) emanating from the same node as said link. Alternatively, the sum of elements in column j can be normalized to the intrinsic score $X_j$ of node j. The fourth (optional) step (406) of the algorithm 320 introduces a random jump term d by adding to each matrix element a number d/N, wherein d is typically a value small compared with 1. This random jump factor eliminates problems that can otherwise occur due to isolated nodes, isolated clusters of nodes, or loops in the network, which would, in some circumstances, accumulate authority at the expense of all other nodes, or due to "dead ends", which would interrupt the propagation of authority through the network. The inclusion of a random jump term in all components renders the matrix M dense and its manipulation computationally costly. Therefore, it can be advantageous, instead of including a term d/N in the matrix itself, to add d/N (multiplied by the sum of elements of vector s) directly to each element of the score vector s, following each matrix multiplication step and preceding vector normalization. This procedure results in the same updated ranking score vectors $s^{(n+1)}$ at the end of each iteration step as the modification of the link matrix M with the term d/N. The random jump term d and the weighting factor α are parameters of the algorithm which can be fine-tuned to allow for the best possible ranking results.

An N×N matrix generally has N eigenvectors; however, only one of them, the principal eigenvector, which corresponds to the largest eigenvalue, has all positive components. If all of the elements of matrix M and all of the elements of the initial ranking score vector are positive, as in the embodiment illustrated above, and subsequent ranking vectors converge, the final ranking vector has only positive components as well. This guarantees that the algorithm results in a unique vector of ranking scores, up to a normalization factor, whose choice depends on practical considerations.

Those of skill in the art will appreciate that the embodiment described above can be modified in various ways without deviating from the scope of the invention. For example, in some applications, it can be suitable to weight matrix element $M_{ij}$ by the intrinsic score of node i rather than node j, thereby propagating authority backwards through a chain of links, i.e., basing the authority a node inherits on the intrinsic scores of the nodes it links to, as opposed to the intrinsic scores of nodes that link to it. It is also possible to combine forward and backward propagation of authority through the network, e.g., by alternating multiplication with M and its transpose.

2.2. Random Walk Implementation

Figure 5:
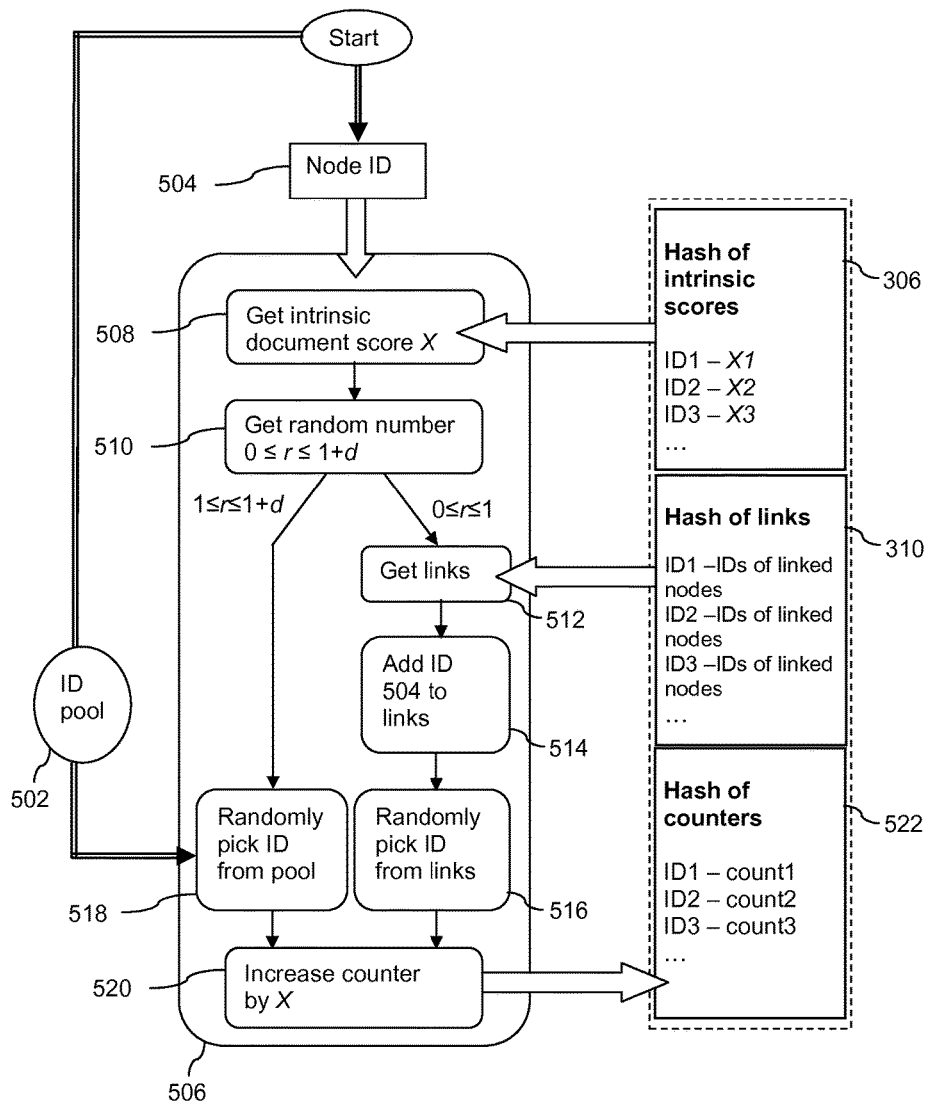
FIG. 5 is a diagram illustrating data structures and the steps of an algorithm according to alternative embodiments of the invention.

An alternative class of embodiments, which implements method 200 in a different way (which, however, can be specified to be equivalent to the matrix implementation 300) is illustrated in FIG. 5. This implementation again utilizes the hash tables 306 for intrinsic node scores and 310 for links, established in the same manner as described above by means of FIG. 3, and simulates a random walk through the network of interlinked nodes. The walk starts at a node randomly chosen from a pool of nodes 502, whose ID is stored in a node variable 504. The node variable 504 constitutes the input value for algorithm 506, each call of which constitutes a step of the random walk. Algorithm 506 retrieves, in a first step 508, the intrinsic document score X pertaining to node variable 504 from the hash table 306. In step 510, it generates a random number r which is uniformly distributed between 0 and 1+d. If 0≤r≤1, algorithm 506 retrieves the IDs of the nodes linked to by the node identified in variable 504 from the hash table 310 (step 512), adds the ID stored in 504 to that list (step 514), and randomly chooses a node from this list (step 516), but such that the probability of picking the original node with the ID identified in variable 504 equals the probability of picking any of the other nodes, multiplied by a weighting parameter a equivalent to that used in the matrix implementation. If 0≤r≤1+d, a new node is randomly picked from the pool 502 (step 518), corresponding to a random jump with probability d/(1+d). In step 520, a counter for the randomly selected node, which is stored in a counter hash table 522, is incremented by the intrinsic document score X of the original node. The node variable 504 is then updated to the ID of the newly chosen document, and algorithm 506 starts over. After many iterations of this algorithm, i.e. many steps of the random walk, the procedure is terminated, and the counter values stored in hash 522 comprise the authority scores s, up to normalization. The number of steps can be predetermined, or depend on a convergence criterion for s analog to that used in the matrix implementation.

3. Applications

Method 200 can generally be applied to any set of linkable nodes, and any quantifiable property of the nodes can be utilized for the assignment of intrinsic scores. In the following three exemplary applications, the nodes are documents.

Figure 6A:
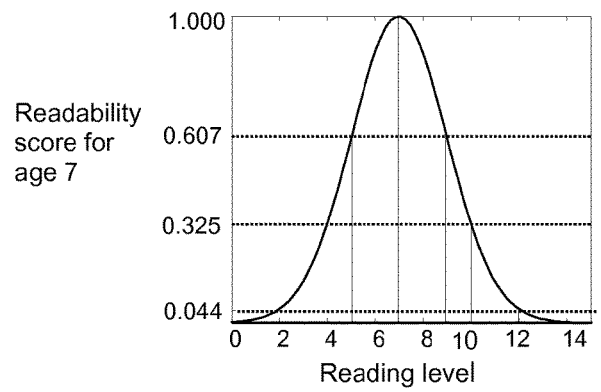
FIG. 6A is a graph illustrating the assignment of readability scores to documents in accordance with one embodiment.

In one embodiment, the nodes are ranked according to their reading level with respect to a user's age. The reading level of an individual text document can be computed with readability formulae, e.g. the Flesh-Kincaid or the Powers-Sumner-Kearl formula, from simple text metrics such as the number of words per sentence or the number of syllables per word. It is given in terms of the minimum age that a reader must have in order to understand the document. Specific to a user age, a document can be assigned a readability score R that depends, for example, on the difference or the ratio of the user age u and the reading level of the document rl. For instance, R can have a Gaussian dependence on |rl−u| according to the formula $R=\exp[-(rl-u)^2/2\sigma]$, where σ determines the width of the Gaussian distribution. FIG. 6A illustrates the dependence of readability scores R on the reading levels rl of documents for a user of age u=7. Documents of reading level 7 receive a readability score of 1, whereas documents with either higher or lower reading levels receive a score smaller than 1. In this particular example, the readability score assignment is symmetric around the user age. However, in some embodiments, it could be advantageous to assign scores in an asymmetric fashion, e.g., giving preference to documents with a too low reading level over those with a too high reading level. More detail about ranking according to the readability of individual documents is provided in U.S. Provisional Application No. 60/719,323, filed on Nov. 21, 2005, and U.S. patent application Ser. No. 11/522,746, filed on Nov. 18, 2006, the entire disclosures of which are hereby incorporated by reference.

Figure 6B:
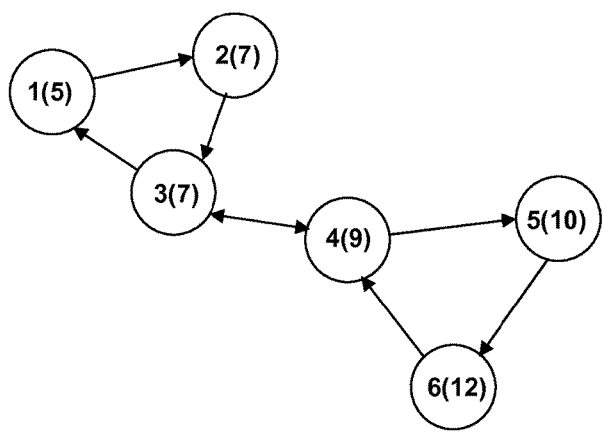
FIG. 6B depicts a simple network of interlinked documents with readability scores assigned as illustrated in FIG. 6A.

FIG. 6B illustrates a simple network of six interlinked nodes, wherein circled numbers represent the nodes, arrows indicate directed links between the nodes, and numbers in parentheses indicate the reading levels rl of the nodes. For example, document 1 is suitable for five-year-olds, documents 2 and 3 are for seven-year-olds, etc. The corresponding readability scores for a user of age 7 are indicated in FIG. 6A by dotted lines.

FIG. 6C shows a representative conventional link matrix M that does not include intrinsic scores, along with its principal eigenvector, which provides the authority ranking scores of the six nodes. Considering only its link structure, the network possesses a symmetry in the two clusters composed of documents 1, 2, 3, and documents 4, 5, 6. Since documents 3 and 4 contain the largest number of links, they rank highest, followed by documents 1 and 5, and last documents 2 and 6. This symmetry is broken through the inclusion of readability scores in computing the rank, as illustrated in FIGS. 6D and 6E, which show the link matrix M and corresponding principal eigenvector for two embodiments.

In FIG. 6D, the elements of the link matrix M which correspond to existing links between the nodes, including the diagonal elements, are populated by the readability scores of the documents the links originate from. From the associated eigenvector, the following ranking can be read off: Document 3, which is of the desired reading level, with respect to the seven-year-old user, ranks highest. Document 4 ranks second, closely followed by document 1. The reading levels for both of these documents differ from the user age 7 by two years. The slight difference in rank is due to authority propagation from the linking documents. Document 2, although of the desired reading level, ranks only fourth, since it is not linked to by a document of the desired reading level, as opposed to the higher ranking documents 1 and 4. For documents 5 and 6, which rank fifth and sixth, readability scores and authority propagation effect the scores in the same direction.

The weight of the readability scores on the rank can be increased with a weighting factor $\alpha$ that multiplies the diagonal elements. This modification is illustrated in FIG. 6E with $\alpha=10$. With the modified matrix of this embodiment, document 3 still receives the highest ranking score since its own reading level and that of one of the documents linking to it is 7, but now document 2, which has also reading level 7, places second, whereas documents 1 and 4 are ranked third, corresponding to their lower readability. It is apparent from this example, that $\alpha$ can be tuned to provide for optimal ranking results. The final ranking will in general be, although it does not have to be, different from a ranking obtained by applying readability scores to individual documents only.

Another embodiment relates specifically to web sites and their safety and appropriateness for underage users. In view of the ease with which any type of documents can be distributed over the Internet, effective ranking and filtering techniques for language and visuals are of great value for the protection of minors. Documents that contain profane language can be filtered with the help of a list of profane words, against which each document is matched. In a similar manner, racist propaganda and hate mongering can be identified through their characteristic language. Pornographic and other inappropriate pictorial content, on the other hand, is harder to evaluate in an automated fashion. Whereas a human can easily detect pornography, there is no reliable computer algorithm that can do the same as effectively. However, web sites containing such images are likely to be linked to by other unsafe documents, including documents containing profane language. Anchor text (the highlighted text constituting a link) which contains profane words is particularly indicative of an unsafe site. The link structure of the Internet can be exploited for safety filtering through safety-specific authority ranking. For each document, an initial intrinsic safety score is computed from easily accessible safety metrics, such as the number of profane words, and the rank of each document is based on the intrinsic scores of the documents it links to and/or from. Filtering can be implemented by imposing a lower cut-off value on allowable safety-specific ranking scores.

Yet another embodiment integrates the search token(s) itself into the authority-based ranking algorithm, thereby improving the relevancy of search results to the search topic. For a single-word query, the intrinsic scores with which links are weighted could, for example, be based on the frequency of occurrence of the search token in each document. For a search query consisting of several words, and possibly even being a document itself, the intrinsic score could be computed from vectors representing all the words contained in the query and the documents of the queried repository, respectively. In query-specific authority ranking, the rank of a document improves due to links from documents that are relevant to the specific search, and documents of high relevance to the search are identified even if they do not contain the search token, for instance, as a consequence of synonymy. The use of search-specific intrinsic scores is particularly advantageous if the number of documents containing the search token(s) is either very small or very large. If only few documents contain the search token(s), they will be supplemented by documents that they link to, which are often thematically related. If many documents contain the search token, those with high ranks can be considered authorities on the search topic since they are cited by other documents on the same or similar subject matter. Query-specific authority ranking thus enables the user to find the most reputable documents from among all documents pertaining to her specific search. As an alternative to using the search token itself in the intrinsic scores, topical user preferences independent of a particular search can be employed in the ranking algorithm. For example, a user who has indicated a preference for physics will, upon searching for "cars", receive a list of documents pertaining to Coherent Anti-Stokes Raman Scattering, whereas other users will generally receive information about automobiles among the highest ranking documents.

Although the present invention has been described with reference to specific details, it is not intended that such details should be regarded as limitations upon the scope of the invention, except as and to the extent that they are included in the accompanying claims.

What is claimed is:

1. A computer-implemented method of ranking a plurality of linkable documents accessible via a computer network, each of the documents associated with a respective web site, the method comprising the steps of:
   analyzing, by a server on the network, each document of the plurality of linkable documents so as to measure one or more criteria of each document, each criterion being independent of links between the document and other documents accessible via the computer network and at least one criterion including user traffic or popularity of the respective web site;
   assigning, by the server, an intrinsic score to each document based on the analysis, the intrinsic score being independent of links between the document and other documents accessible via the computer network;
   identifying for each document, by the server, all links between the respective document and one or more other documents accessible via the computer network, where links are hyperlinks; and
   generating, by the server, a ranking score for each document based at least in part on the intrinsic scores of each of the one or more other documents accessible via the computer network with one or more links directed to the respective document, wherein each link is assigned a weighting factor and the weighting factors are incorporated into the ranking scores, and iteratively updating the ranking score of each document based on previous ranking scores and the intrinsic scores of documents linked therewith.

2. The method of claim 1 wherein ranking scores are updated until a convergence criterion is satisfied.

3. The method of claim 1 wherein identifying links further comprises defining each document as linking to itself.

4. The method of claim 1 wherein the weighting factor of a link comprises the intrinsic score of at least one of the documents associated with the link.

5. The method of claim 1 wherein the weighting factor of a link comprises a factor other than the intrinsic scores of the documents associated with the link.

6. The method of claim 5 wherein the weighting factor comprises a normalization factor.

7. The method of claim 1 wherein a link between a document and itself has a different weighting factor than a link between a document and another document.

8. The method of claim 1 wherein the at least one criterion is based on a user input.

9. The method of claim 1 wherein the at least one criterion is at least in part based on responsiveness of the documents to one or more user-specified topics.

\* \* \* \* \*